United States Patent
Aasberg-Petersen (12)

(10) Patent No.: US 6,338,833 B1
(45) Date of Patent: Jan. 15, 2002

(54) PROCESS FOR AUTOTHERMAL CATALYTICAL STREAM REFORMING

(75) Inventor: Kim Aasberg-Petersen, Holte (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/511,236

(22) Filed: Feb. 23, 2000

Related U.S. Application Data

(60) Provisional application No. 60/123,178, filed on Mar. 5, 1999.

(51) Int. Cl.⁷ .................................................. C01B 3/26
(52) U.S. Cl. ..................... 423/652; 423/418.2; 252/373
(58) Field of Search .............................. 423/418.2, 652; 252/373

(56) References Cited

U.S. PATENT DOCUMENTS

| | | | | |
|---|---|---|---|---|
| 5,160,713 A | * | 11/1992 | Mazanec et al. ............ 423/210 |
| 5,276,237 A | * | 1/1994 | Mieville ..................... 585/500 |
| 5,980,840 A | * | 11/1999 | Kleefisch et al. ............ 422/211 |
| 6,066,307 A | * | 5/2000 | Keskar et al. ............ 423/648.1 |
| 6,077,323 A | * | 6/2000 | Nataraj et al. ............. 48/198.1 |

* cited by examiner

Primary Examiner—Wayne Langel
Assistant Examiner—Maribel Medina-Sanabria
(74) Attorney, Agent, or Firm—Ostrolenk, Faber, Gerb & Soffen, LLP

(57) ABSTRACT

Process for the preparation of a hydrogen and/or carbon monoxide rich gas from a hydrocarbon feedstock comprising partial oxidation of the feedstock with an oxidant supplied by permeation through a membrane and steam reforming of the feedstock in presence of a steam reforming catalyst being arranged on permeation side of the membrane, wherein steam reforming activity of catalyst is reduced at inlet region of the catalyst bed.

5 Claims, 1 Drawing Sheet

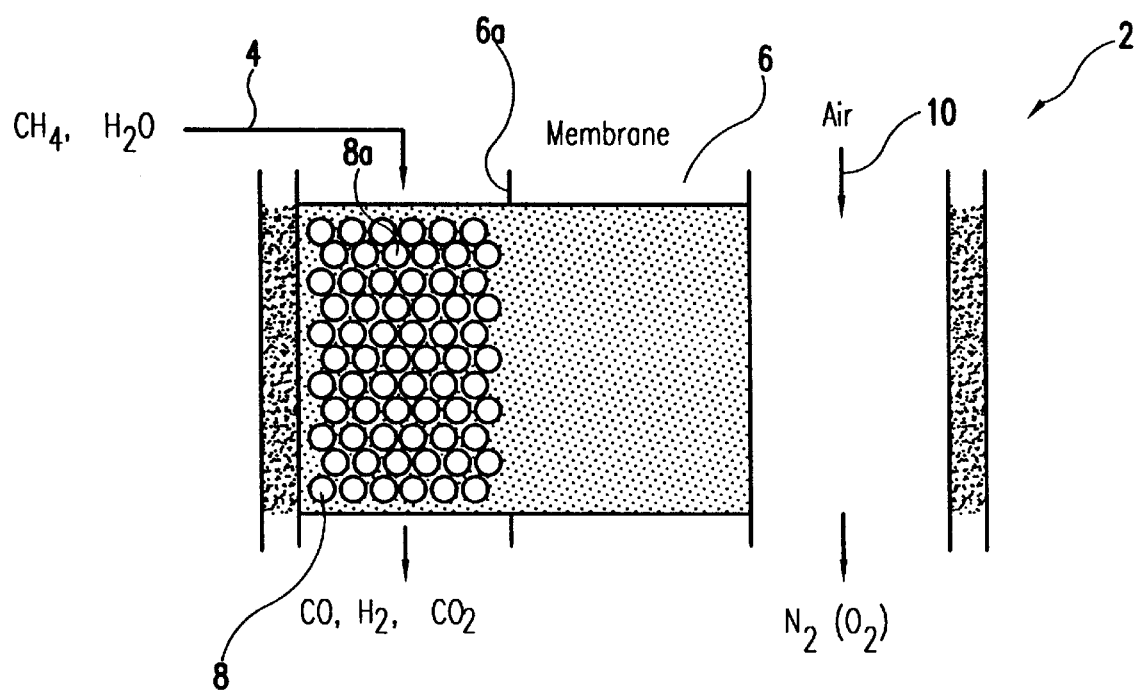

PROCESS FOR AUTOTHERMAL CATALYTICAL STREAM REFORMING

This application claims the benefit of U.S. Provisional Application No. 60/123,178, filed Mar. 5, 1999.

BACKGROUND OF THE INVENTION

1. Field of the Invention

The present invention relates to autothermal catalytic steam reforming of a hydrocarbon feedstock. In particular, the invention is directed to certain improvements of the known autothermal catalytic steam reforming processes, wherein an oxidant is supplied to a reacting process gas by means of a membrane.

2. Description of the Related Art

It is known in the art that a reactor with dense ceramic membranes that conduct oxygen can be used for syngas production (e.g. WO 98/48921).

Synthesis gas is produced in a membrane reactor by utilising the oxygen transported from the oxidant side of the membrane. Production of synthesis gas can be represented by the following three reactions:

$CH_4 + H_2O \Leftrightarrow CO + 3H_2$
$CH_4 + \frac{1}{2}O_2 \Rightarrow CO + 2H_2$
$CO + H_2O \Leftrightarrow CO_2 + H_2$ In the above process inlet temperature of the gas will typically be between 500–800° C. The pressure on the synthesis gas side of the membrane varies from ambient to 90 bar and the pressure on the air side from ambient to 26 bar.

The methane steam reforming and shift reactions are typically close to equilibrium at the reactor outlet.

SUMMARY OF THE INVENTION

By the invention the known membrane autothermal catalytic steam reforming process is improved by controlling the temperature gradient in the reactor, when employing a catalyst with reduced or no steam reforming activity in at least a top portion of the autothermal reactor.

Accordingly, this invention is a process for the preparation of a hydrogen and/or carbon monoxide rich gas from a hydrocarbon feedstock comprising partial oxidation of the feedstock with an oxidant supplied by permeation through a membrane and steam reforming of the feedstock in presence of a steam reforming catalyst being arranged on permeation side of the membrane, wherein steam reforming activity of catalyst is reduced in at least an inlet region of the catalyst bed.

BRIEF DESCRIPTION OF THE DRAWINGS

The principle of autothermal membrane steam reforming is illustrated in the FIGURE.

DETAILED DESCRIPTION OF THE PREFERRED EMBODIMENT

A feedstock 4 containing hydrocarbons (methane is used as Example in the FIGURE and in the following) enters reactor 2 at permeation side 6a of membrane 6. The compartment at this side of the membrane is loaded with steam reforming catalyst and/or partial oxidation catalyst 8. At feed inlet the activity of the catalyst is in top layer 8a reduced compared to the catalyst activity in the reminder of the catalyst bed. Instead of being arranged in fixed manner, the catalyst may alternatively be direct supported on permeation side of the membrane (not shown).

An oxygen containing stream 10 (air is used as example in the FIGURE and in the following) enters the reactor at the opposite side of the membrane. Suitable membrane materials with the ability to transport oxygen are known in the art. In the case that oxygen ions are the mobile species, electrons move through the membrane in the opposite direction thus ensuring electroneutrality. The oxygen flux depends in a complex manner on the oxygen partial pressure difference.

In case the catalyst has no steam reforming activity in top layer 8a, the catalyst serves as an oxidation catalyst.

Thereby, the following advantages are obtained:

The mechanical design of the reactor becomes less complex;

Operation at lower feed and/or oxidant inlet temperature becomes feasible resulting in decreased heat exchanger area and lower fuel consumption;

The required membrane area becomes smaller.

Catalysts for the oxidation of hydrogen or hydrocarbons are known in the art. Steam reforming catalysts with reduced reforming activity may be obtained by impregnation of a carrier material with reduced amounts of catalytic material and/or addition promoter compounds reducing the activity of the catalytic active material. Those catalyst preparation methods and catalysts with reduced steam reforming activity are furthermore known in the art.

As further an advantage, a catalyst with reduced activity enables carbon free operation at a lower steam-to-carbon ratio by adding promoters to a catalyst to increase the carbon resistance and reducing the steam reforming activity of that catalyst.

When operating the known catalytic autothermal steam re-former with supply of oxygen through a membrane, the steam reforming equilibrium temperature of the feed gas is below the usual reactor inlet temperature of the feed gas. The steam reforming reaction proceeds thereby instantly as the feed gas makes contact with the catalyst. Since the steam reforming reaction is highly endothermic a reduction of the gas and catalyst temperature will be observed as compared to the gas inlet temperature.

Oxygen flux through the membrane increases with temperature and below a certain temperature ($T_0$) the oxygen flux is substantially zero.

Consequently, the oxygen flux through the membrane per unit area will in a reactor provided with catalysts having high steam reforming activity be reduced. This has one of two consequences:

a) The temperature in the reactor drops to a level below which the oxygen flux through the membrane becomes negligible. The only means to avoid that is to increase the feed inlet temperature.

b) The oxygen flux is reduced as compared to the oxygen flux at the temperature of the feed gas.

By the inventive process operating on a catalyst with reduced or zero steam reforming activity in the reactor inlet portion, the temperature reduction is eliminated or becomes much less pronounced. Consequently, the temperature can either be reduced to a level closer to $T_0$ or the membrane area may be decreased because oxygen is transferred through the membrane at a higher (mean) temperature.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. Process for the preparation of a hydrogen and/or carbon monoxide rich gas from a hydrocarbon feedstock comprising:

partial oxidation of the feedstock with an oxidant supplied by permeation through a membrane and steam reforming of the feedstock in presence of a steam reforming catalyst being arranged on permeation side of the membrane, wherein the feedstock and the oxidant are supplied in a co-current direction and the reaction temperature at least at an inlet portion of the reactor is controlled by the steam reforming activity of the catalyst, the steam reforming activity being reduced in at least the inlet region of the catalyst bed compared to the steam reforming activity in the remainder of the catalyst bed.

2. The process of claim 1, wherein the catalytic activity for the steam reforming in the inlet region is reduced to zero.

3. The process of claim 2, wherein the catalyst in the inlet region has activity in the oxidation of the hydrocarbon feedstock.

4. The process according to claim 1, wherein the catalyst is arranged at fixed bed.

5. The process according to claim 1, wherein the catalyst is supported on the membrane.

* * * * *